United States Patent

Kwon

Patent Number: 6,052,752
Date of Patent: Apr. 18, 2000

[54] HIERARCHICAL DUAL BUS ARCHITECTURE FOR USE IN AN ELECTRONIC SWITCHING SYSTEM EMPLOYING A DISTRIBUTED CONTROL ARCHITECTURE

[75] Inventor: Hwan-Woo Kwon, Incheon, Rep. of Korea

[73] Assignee: Daewoo Telecom Ltd., Incheon, Rep. of Korea

[21] Appl. No.: 08/748,990

[22] Filed: Nov. 14, 1996

[30] Foreign Application Priority Data

Dec. 28, 1995 [KR] Rep. of Korea ............... 95-60974

[51] Int. Cl.[7] .................................. G06F 13/40
[52] U.S. Cl. ................. 710/126; 710/128; 710/131
[58] Field of Search ................... 395/300, 301, 395/302, 303, 306, 308, 822, 311; 364/240; 710/120, 128, 131, 126, 132

[56] References Cited

U.S. PATENT DOCUMENTS

| | | |
|---|---|---|
| 4,490,785 | 12/1984 | Strecker et al. . |
| 4,891,751 | 1/1990 | Call et al. ............................ 364/200 |
| 4,912,633 | 3/1990 | Schweizer et al. ................. 364/200 |
| 4,975,838 | 12/1990 | Mizuno et al. ...................... 364/200 |
| 4,985,830 | 1/1991 | Atac et al. ........................... 364/200 |
| 5,067,071 | 11/1991 | Schanin et al. ..................... 395/275 |
| 5,107,257 | 4/1992 | Fukuda ........................... 340/825.08 |
| 5,214,775 | 5/1993 | Yabushita et al. ................. 395/200 |
| 5,230,065 | 7/1993 | Curley et al. ....................... 395/200 |
| 5,263,139 | 11/1993 | Testa et al. .......................... 395/325 |
| 5,360,952 | 11/1994 | Brajczewski et al. ............... 187/246 |
| 5,387,769 | 2/1995 | Kupersmith et al. ............... 187/248 |
| 5,422,877 | 6/1995 | Brajczewski et al. ................ 370/16 |
| 5,581,767 | 12/1996 | Katsuki et al. ..................... 395/311 |
| 5,592,632 | 1/1997 | Leung et al. ....................... 395/306 |
| 5,613,077 | 3/1997 | Leung et al. ....................... 395/306 |
| 5,659,687 | 8/1997 | Kim et al. .......................... 395/292 |
| 5,666,480 | 9/1997 | Leung et al. ....................... 395/180 |
| 5,764,933 | 6/1998 | Richardson et al. ............... 710/128 |
| 5,790,814 | 8/1998 | Gan et al. ........................... 710/128 |
| 5,796,964 | 8/1998 | Bass et al. .......................... 395/308 |
| 5,812,800 | 9/1998 | Gulick et al. ....................... 710/128 |

*Primary Examiner*—Xuan M. Thai
*Attorney, Agent, or Firm*—Pennie & Edmonds LLP

[57] ABSTRACT

A bus architecture for use in a data communication system provides a communication path between processors and one or more external devices including (M+1) hierarchical processors. Each of the processors is categorized into one of N hierarchies with M and N being a positive integer larger than 1, respectively, and N is smaller than (M+1). The bus architecture includes a bus having N buses, each of the buses coupled to one or more processors of a hierarchy and (N−1) linking means, and each of the linking means for coupling a bus of a hierarchy to a bus of a next hierarchy.

2 Claims, 6 Drawing Sheets

HIERARCHICAL DUAL BUS ARCHITECTURE FOR USE IN AN ELECTRONIC SWITCHING SYSTEM EMPLOYING A DISTRIBUTED CONTROL ARCHITECTURE

FIELD OF THE INVENTION

The present invention relates to a communication bus architecture for use in an interprocessor communication; and, more particularly, to a dual bus architecture in an electronic switching system having a hierarchical processor structure.

DESCRIPTION OF THE PRIOR ART

For an efficient execution of call processing and OA&M (operation, administration and maintenance) in an electronic switching system employing a large number of processors, use of a hierarchical processor architecture is gaining popularity. For instance, an ASS(Access Switching Subsystem), one of the subsystems included in an electronic switching system which performs scanning of a hook-off, interfacing between a subscriber and the switching system and time switching, typically employs a hierarchical processor architecture. In the hierarchical processor architecture, the functions of processors are divided into two hierarchies, upper and lower, wherein the upper hierarchical functions are performed by a main processor(MP) and the lower hierarchical functions are performed by peripheral processors (PP's). For instance, the MP controls the PP's and coordinates communications between the processors and external devices connected to the MP, thereby performing call processing by instructing the PP's. On the other hand, the PP's perform simple processing operations such as supervising telephony devices, handling the scanning of the subscriber's hook-off and performing signal distribution.

In such a multi-processor configuration, there is needed a mechanism for exchanging data among the processors so as to coordinate their operations. There are several methods of interconnecting or coordinating processors such as global bus network(AXE-10, D 70), star topology(5ESS, EWSD, PROTEO 100/60), switched network(S1240), etc. In these methods, however, the MP and the PP's are arranged to share a common bus: that is, there is no access hierarchy or priority among the processors in such an interconnecting network.

FIG. 1 illustrates an exemplary prior art bus architecture for interconnecting processors associated with a subsystem or module in an electronic switching system. A single shared bus serves an MP 100 and PP's 110, 120, 130; and, consequently, connected to the single shared bus 150 are an MP node 101, PP nodes 111, 121, 131, and even an external gateway(GW) node 141 for interfacing the system and external device(s).

Albeit simple, such a conventional single shared bus architecture has a number of drawbacks. One of the problems with the shared bus architecture is that a hitch in a PP, causing a failure in the shared bus 150, may also disable the communications between the MP 100 and other devices connected thereto. Therefore, as the number of pP's increases, the possibility of a failure in the shared bus will also increase.

Another problem with the shared bus architecture concerns the data processing rate. Specifically, communications between the MP 100 and external devices and data processing among the PP's, 250 to 280, cannot be accomplished simultaneously since all the devices are served by the single shared bus 150, thereby compromising the overall system efficiency.

SUMMARY OF THE INVENTION

It is, therefore, a primary object of the present invention to provide a novel communication bus architecture employing dual buses in an electronic switching system, thereby improving the performance of the switching system.

In accordance with the present invention, there is provided a bus architecture for use in a data communication system for providing a communication path between processors and one or more external devices coupled to the system, including (M+1) number of hierarchical processors, each of the processors being categorized into one of N number of hierarchies with M and N being a positive integer larger than 1, respectively, and N is smaller than (M+1), which comprises: a bussing means including N number of buses, each of the buses coupled to one or more processors of a hierarchy; and (N−1) number of linking means, each of the linking means for coupling a bus of a hierarchy to a bus of a next hierarchy.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENTS

Figure 1:
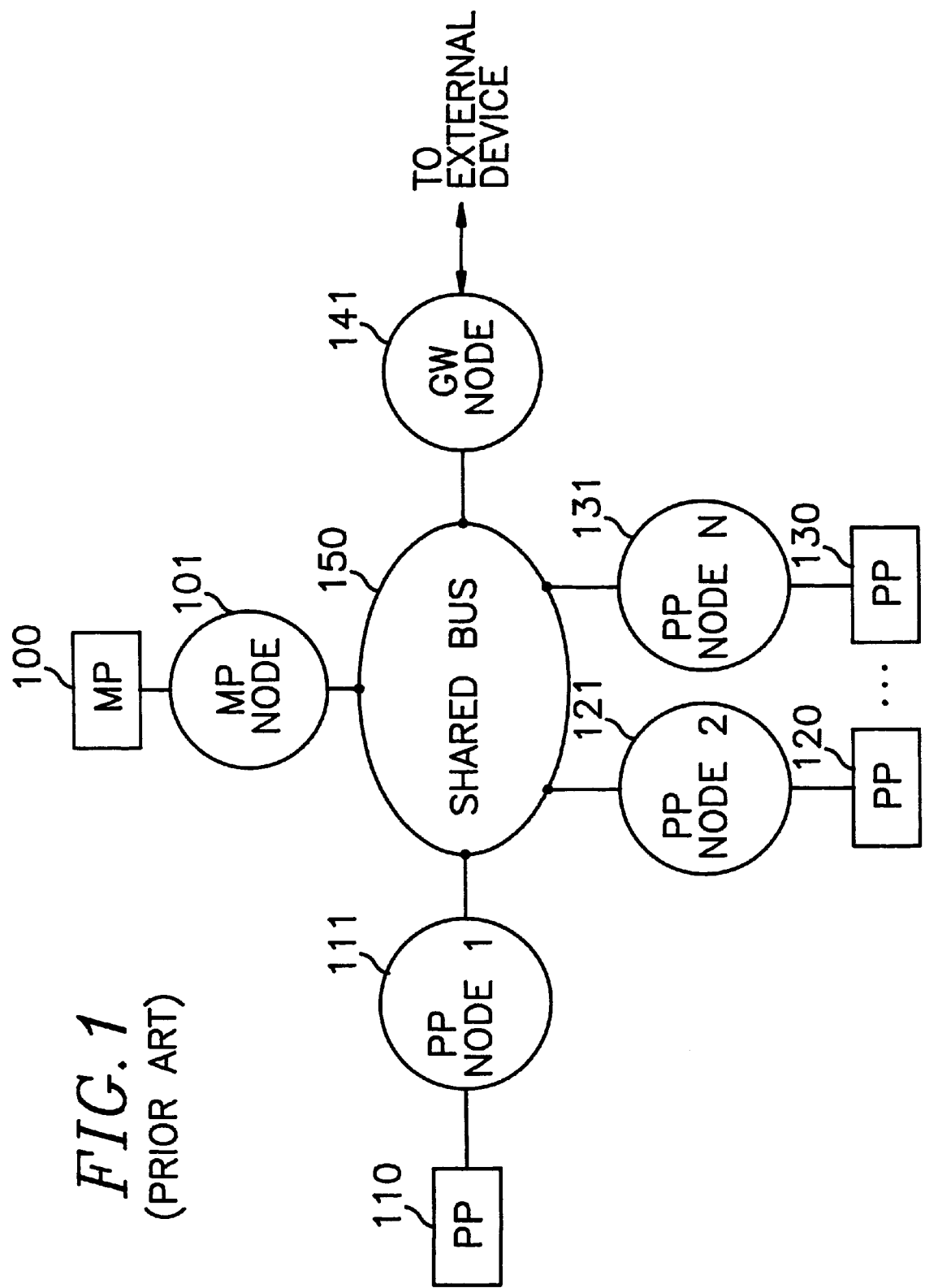
FIG. 1 represents a conventional bus architecture for interprocessor communications in an electronic switching system.
Figure 2:
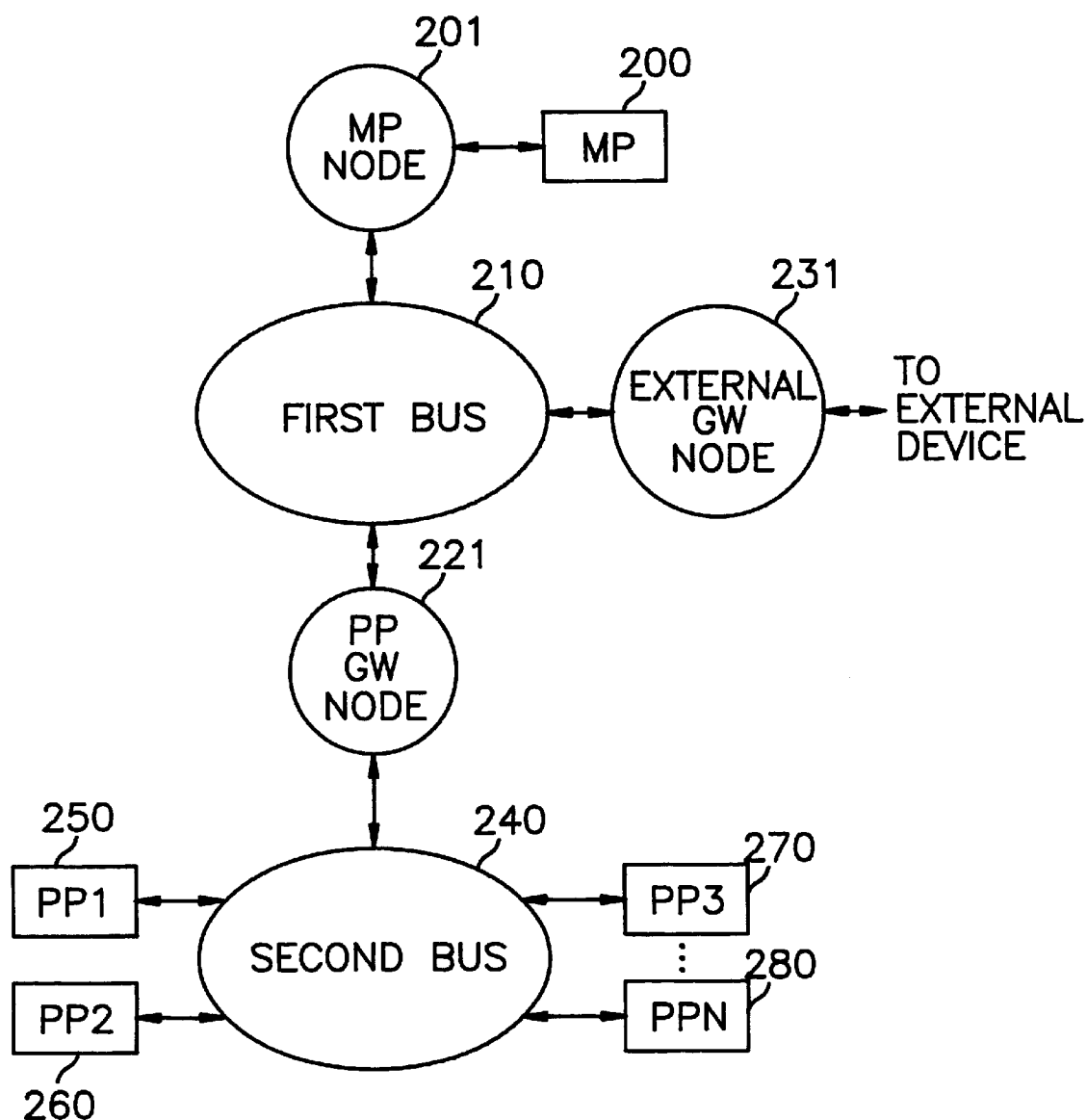
FIG. 2 illustrates a bus architecture in accordance with the present invention.

Referring to FIG. 2, there is illustrated a dual bus architecture of the present invention for use in a subsystem, e.g., an ASS performing such functions as scanning, interfacing and time switching, included in an electronic switching system, wherein the subsystem ASS includes an MP 200 and N number of PP's 250 to 280, N being an integer larger than 1. The dual bus architecture includes an MP node 201, an external GW node 231, a PP GW node 221, a first bus 210 and a second bus 240. The first bus 210 provides a communications path between the MP 200, a representative external device(not shown) and each of the N PP's, 250 to 280, via the second bus 240. The second bus 240 provides a communications path among the PP's 250 to 280, between each of the PP's 250 to 280 and the MP 200 and between each of the PP's and the external device via the first bus 210. The MP 200 and the external device are coupled to the first bus 210 via the MP node 201 and the external GW node 231, respectively, while the PP GW node 221 serves as an interface between the first and the second buses 210, 240. A node represents a device for interfacing or matching processors and devices connected thereto and includes a control unit and a path matching unit. In accordance with a preferred embodiment of the present invention, each of the PP's 250 to 280 also carries out node function, as will be discussed in detail with reference to FIG. 3. It should be noted that even though the second bus 240 is depicted as a single line in FIG. 2 for the sake of simplicity, the actual configuration thereof is of a dual path as shown in FIG. 3.

In accordance with the present invention, communications between the MP 200 and the external device are performed using a communication path via the MP node 201, the first bus 210 and the external GW node 231. And for the communication between the MP 200 and a PP, e.g., PP1 250, a path via the MP node 201, the first bus 210, the PP GW node 221 and the second bus 240 may be used. On the other hand, communications among the PP's 250 to 280 are carried out by the second bus 240. As described above, communications between the MP 200 and the external device and those among the PP's 250 to 280 can be carried out, in accordance with the present invention, independently from each other.

Figure 3:
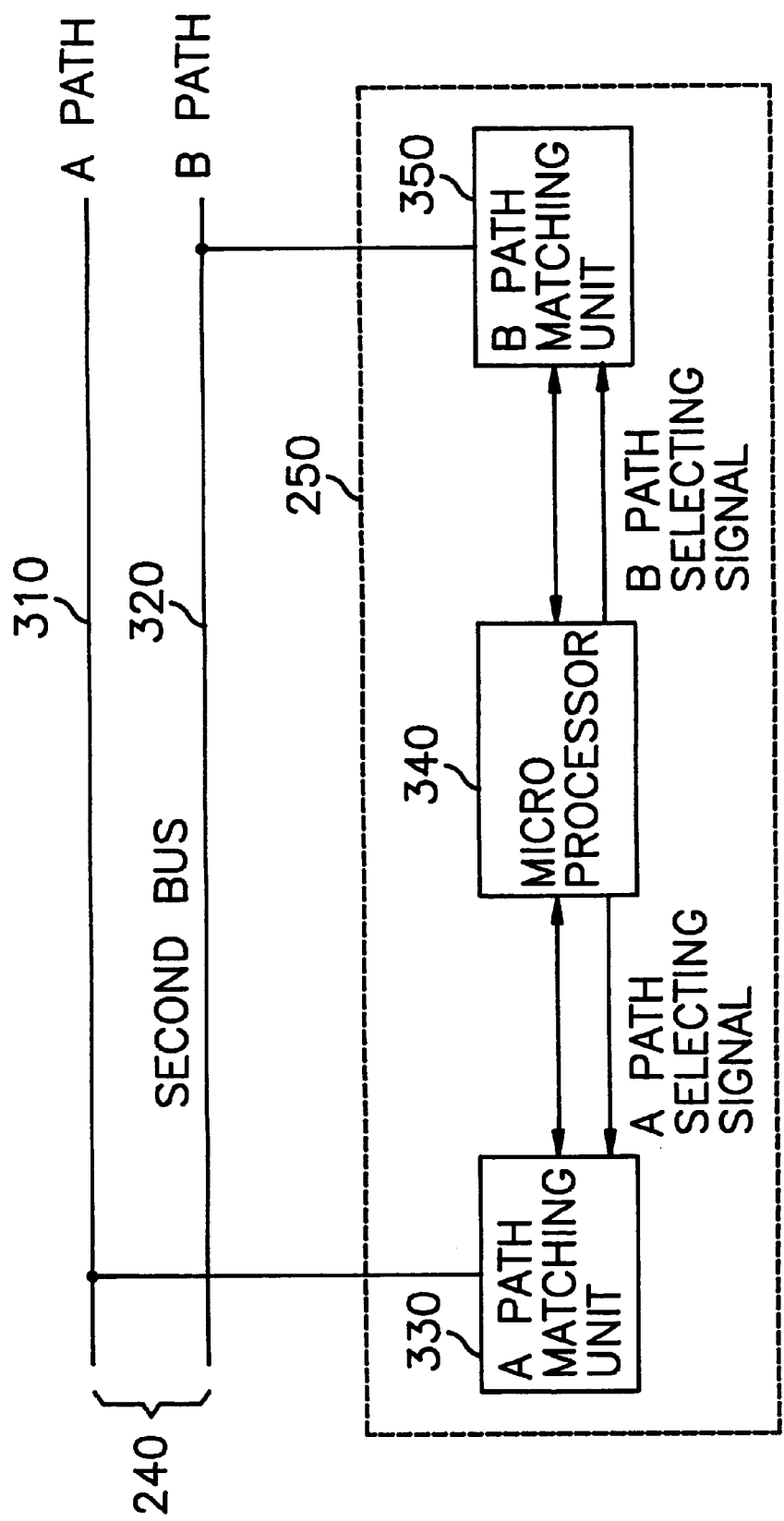
FIG. 3 shows details of a PP shown in FIG. 2.

Referring to FIG. 3, there are provided details of bus control carried out by a PP, e.g., PP1 250. The second bus 240 has a dual path, i.e., A path 310 and B path 320, to provide a redundancy structure and the PP1 250 includes a microprocessor 340, an A path matching unit 330 and a B path matching unit 350. The A path matching unit 330 is connected to the A path 310 and the B path matching unit 350 to a B path 320; and both of the bus matching units 330 and 350 are also coupled to the microprocessor 340. In order to select a path, the microprocessor 340 tests the paths 310 and 320 first to see if they are in normal state, by performing thereon a loop-back test. The loop-back test is, as well known in the art, a bus test method for verifying the path, wherein the microprocessor 340 launches a test signal on each of the paths 310 and 320 via a respective path matching unit and receives a feedback signal therefrom, and then determines whether a path is in a normal state by checking if the two signals are identical. After determining the states of the paths 310 and 320, the microprocessor 340 selects therefrom a path in a normal state by issuing a path selection signal to the path matching unit connected to the selected path; and starts dispatching a data stream thereon via the path matching unit or receiving data provided from another PP or the PP GW node 221 on the selected path. The data stream provided on the path by the microprocessor 340 includes a data signal RxD and a logic high bus occupation signal ASTOUT, which indicates that the path carrying the bus occupation signal ASTOUT is being used for data transfer.

Figure 4:
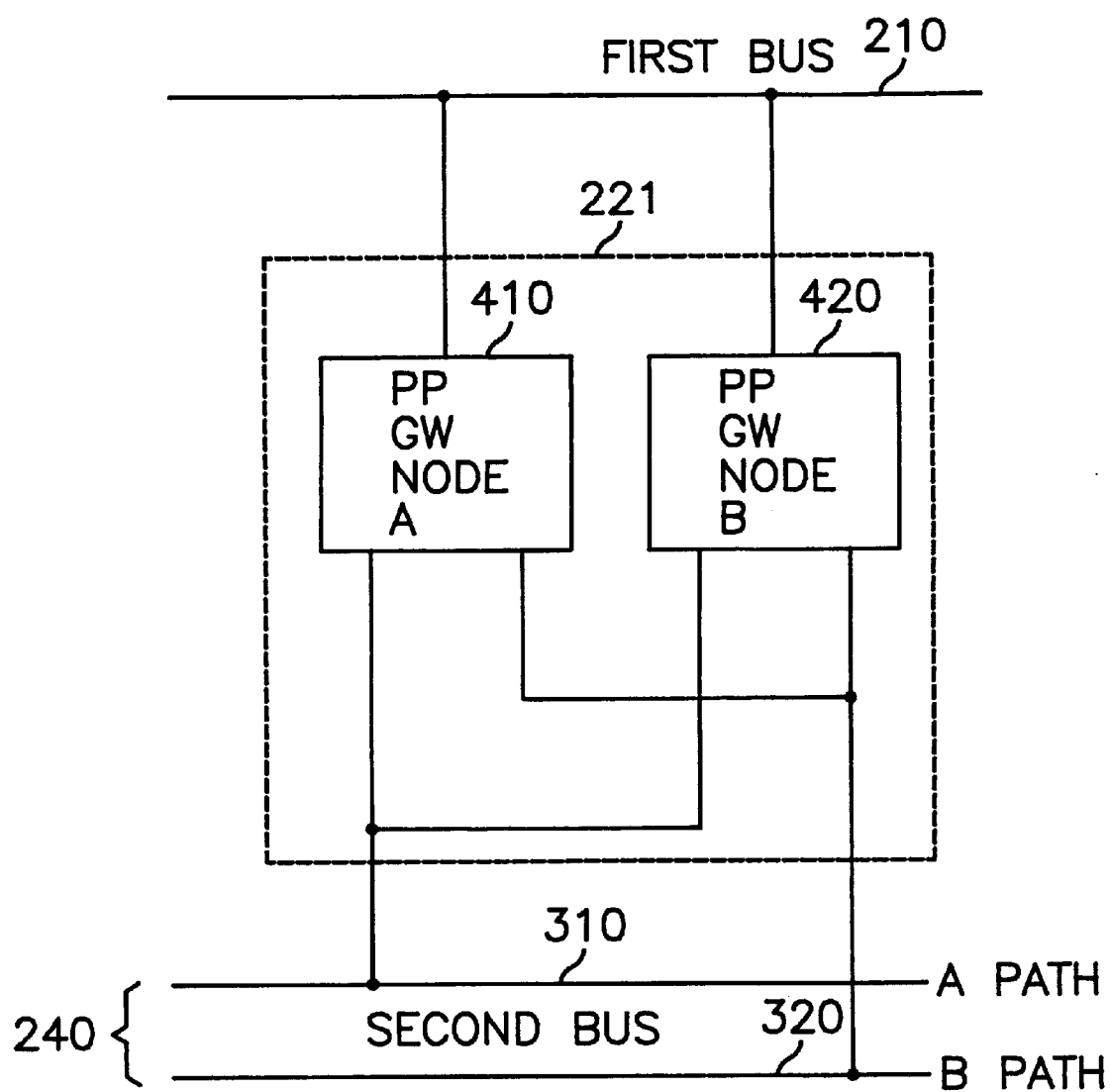
FIG. 4 describes a redundancy structure of a PP GW node shown in FIG. 2.

Referring to FIG. 4, there is illustrated a redundancy structure of the PP GW node 221. The PP GW node 221 includes a PP GW node A 410 and a PP GW node B 420, each having an identical structure and being connected to the first bus 210 and the second bus 240 in parallel. The nodes 410 and 420 operate in an active/standby mode, i.e., while one node is in an active mode, the other is in a standby mode, thereby performing data transfer between the buses 210 and 240 via one of the nodes 410 and 420 at a time. Such redundancy structure is a popular design widely employed in a bus system for the purpose of improving the reliability of the electronic switching system.

Figure 5:
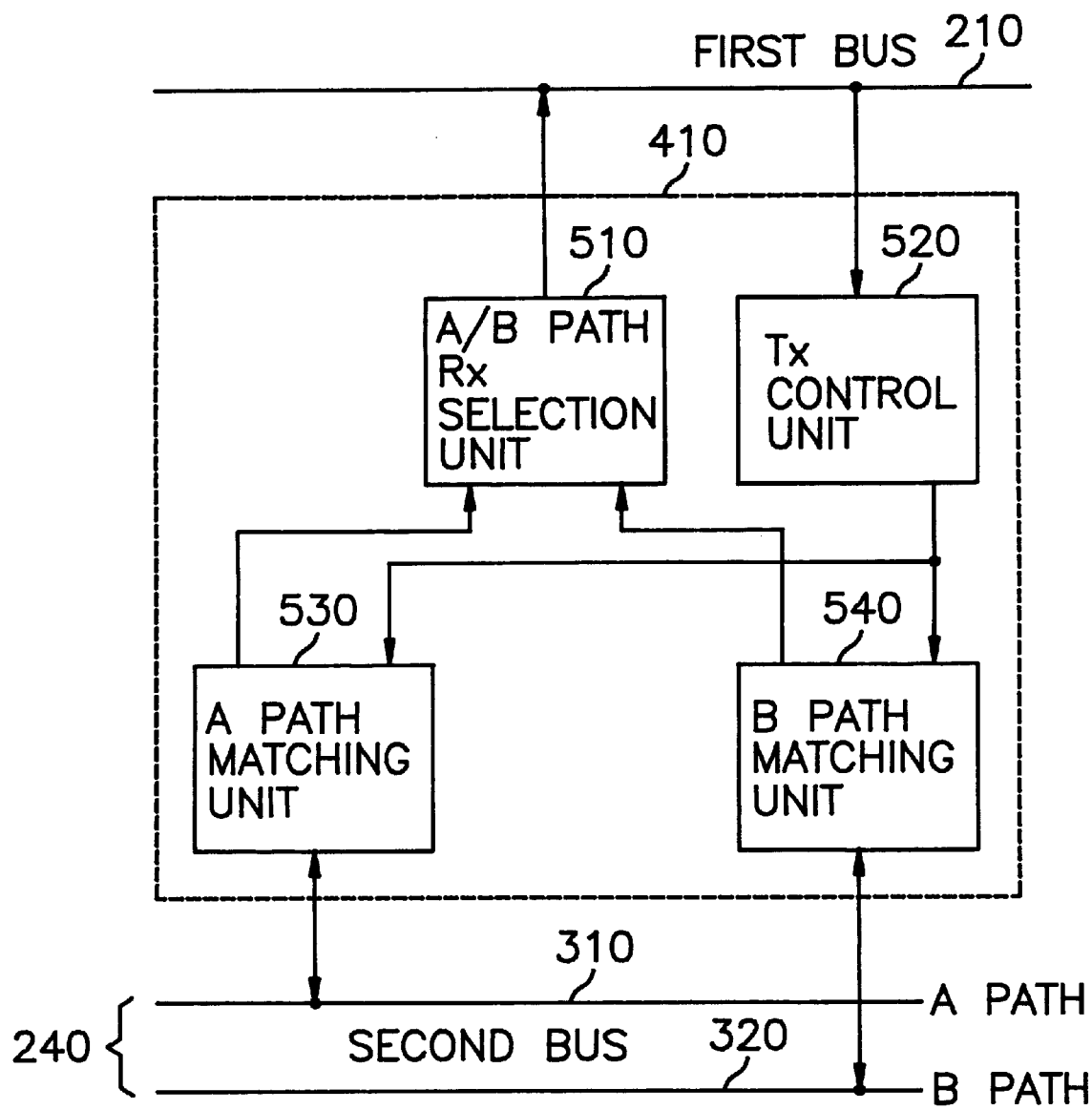
FIG. 5 depicts details of a PP GW node shown in FIG. 4.

FIG. 5 illustrates a detailed structure of the PP GW node A 410 shown in FIG. 4, which includes two path matching units 530 and 540, an A/B path Rx selecting unit 510 and a Tx control unit 520. The path matching units 530 and 540 have an identical structure and interface between the buses 210 and 240 when the node 410 is in the active mode, the A/B path Rx selection unit 510 carries out data transfer from the second bus 240 and the first bus 210, while the Tx control unit 520 serves to transfer data from the first bus 210 to the second bus 240. In order to perform data transfer from the second bus 240 to the first bus 210, the A/B path Rx selection unit 510 monitors the paths 310 and 320 via the A and B path matching units 530 and 540, respectively, and provides the data signal RxD from a PP to the first bus 210 based on the bus occupation signal ASTOUT included in the data stream on the path 310 or 320.

Details of the A/B path selection unit 510 will be described hereafter with reference to FIG. 6. The data transfer from the first bus 210 to the second bus 240 is carried out by the Tx control unit 520, wherein the data on the first bus 210 is received by the Tx control unit and loaded on both of the paths 310 and 320 via the matching units 530 and 540, respectively. The data loaded on the paths 310 and 320 is received by a PP from one of the paths 310 or 320 selected in a manner described with respect to FIG. 3.

Figure 6:
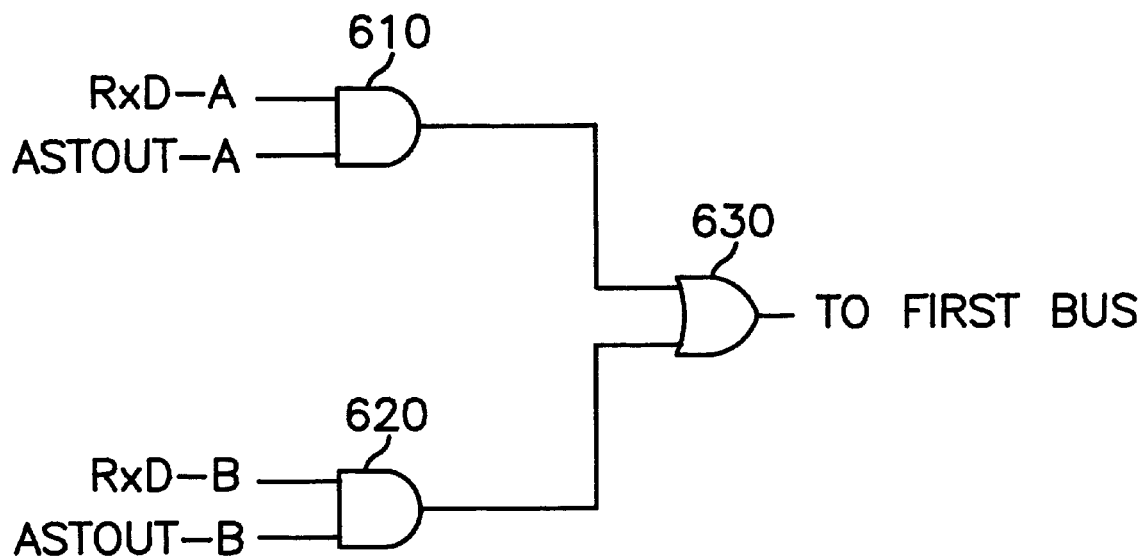
FIG. 6 presents a detailed structure of an A/B bus Rx selecting unit shown in FIG. 5.

FIG. 6 illustrates a detailed structure of the A/B bus Rx selecting unit 510 in accordance with the preferred embodiments of the invention. The A/B path Rx selection unit 510 includes AND gates 610 and 620 coupled to the A and B paths 310 and 320, respectively, and an OR gate 630 coupled to output nodes of the AND gates 610 and 620. In performing data transfer from the second bus 240 to the first bus 210, since a data stream from a PP is loaded only on one of the paths 310 and 320, an AND gate coupled to the unselected path generates null values all the time; and the OR gate 630 provides the first bus 210 with a data signal loaded on the selected path. For instance, if the A path 310 was selected by the PP1 250 and the data signal RxD and the logic high bus occupation signal ASTOUT have been loaded thereon, those signals are inputted to the AND gate 610 as RxD-A and ASTOUT-A, respectively, and the output of the gate 610 becomes identical to RxD-A. On the other hand, since no data stream has been loaded on the B path 320, inputs to the AND gate 620, RxD-B and ASTOUT-B, are all zero values, which in turn causes the AND gate 620 to output zero values. As a consequence, the output of the OR gate 630 mimics the data signal RxD loaded by the PP1 250.

As can be seen from the preferred embodiment described above, the accessibility of the MP 200 to external device(s) is greatly enhanced since the first bus 210 is not occupied by the communications between the PP's, thereby resulting in a significant reduction in the data delay time at the MP node 201 and the external GW node 231. Moreover, a failure in the second bus 240 will be confined thereto and will not hinder normal communications between the MP 200 and the external devices connected thereto, resulting in a failure modularity and an enhancement of the system reliability.

While the present invention has been described with respect to the preferred embodiments, other modifications and variations may be made without departing from the scope and spirit of the present invention as set forth in the following claims.

What is claimed is:

1. A hierarchical bus architecture for use in a data communication system for providing a communication path between a plurality of processors and one or more external devices coupled to the system, said bus architecture comprising:

a first bus;

first, second and third nodes, each directly connected to said first bus;

a main processor belonging to a first hierarchy and connected to said first bus via said first node;

at least one external device connected to said first bus via said second node;

a second bus connected to said first bus via only said third node, wherein said second bus comprises redundant first and second data paths; and a plurality of peripheral processors belonging to a second hierarchy and connected to said second bus, wherein each of said peripheral processors is connected to both of said first and second data paths of said second bus and includes:

a microprocessor;

a first matching unit connected to said microprocessor and arranged to selectively connect said microprocessor to said first data paths; and a second matching unit connected to said microprocessor and arranged to selectively connect said microprocessor to said second data path, wherein said third node comprises first and second gateway nodes, each gateway node having a first and a second connection to respective said first and second data paths of said second bus, each gateway node also having a third connection to said first bus, wherein said each gateway node includes:

first and second path matching units connected to corresponding said first and second data paths;

a receive selection unit arranged to receive an input from each of said first and second path matching units, and further arranged to output a signal to said first bus; and a transmit control unit arranged to receive an input from said first bus, and further arranged to output a signal to both of said first and second path matching units.

2. The hierarchical bus architecture of claim 1, wherein said receive selection unit comprises:

a first AND gate arranged to receive first and second inputs from said first path matching unit of said receive selection unit;

a second AND gate arranged to receive first and second inputs from said second path matching unit of said receive selection unit; and an OR gate arranged to receive outputs of said first and second AND gates, said OR gate having an output connected to said first bus.

* * * * *